(No Model.)  2 Sheets—Sheet 1.
R. G. ROMBAUER.
HAND CAR.
No. 366,882.  Patented July 19, 1887.
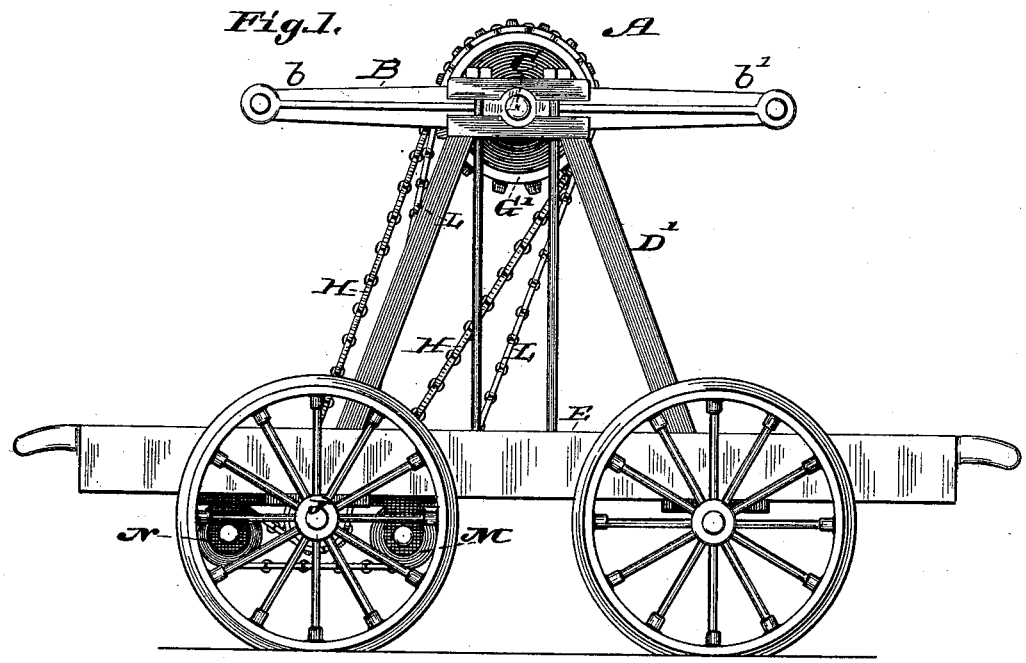
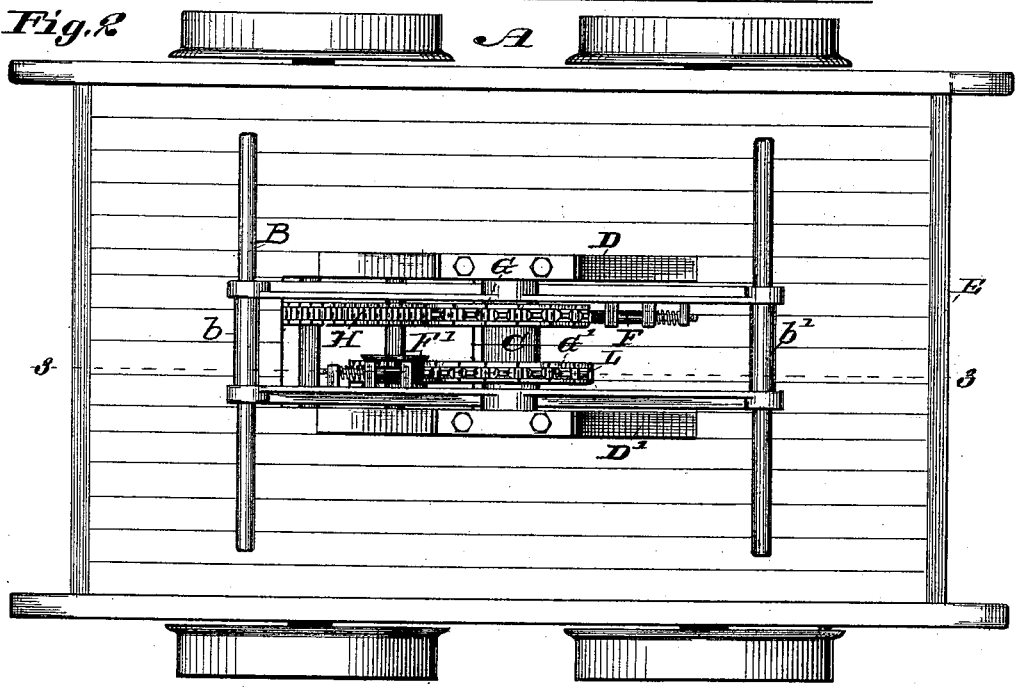
Attest:
N. B. Anderson.
J. W. Hoke.
Inventor:
Raphael G. Rombauer
by C. D. Moody
atty (No Model.) 2 Sheets—Sheet 2.
R. G. ROMBAUER.
HAND CAR.
No. 366,882. Patented July 19, 1887.
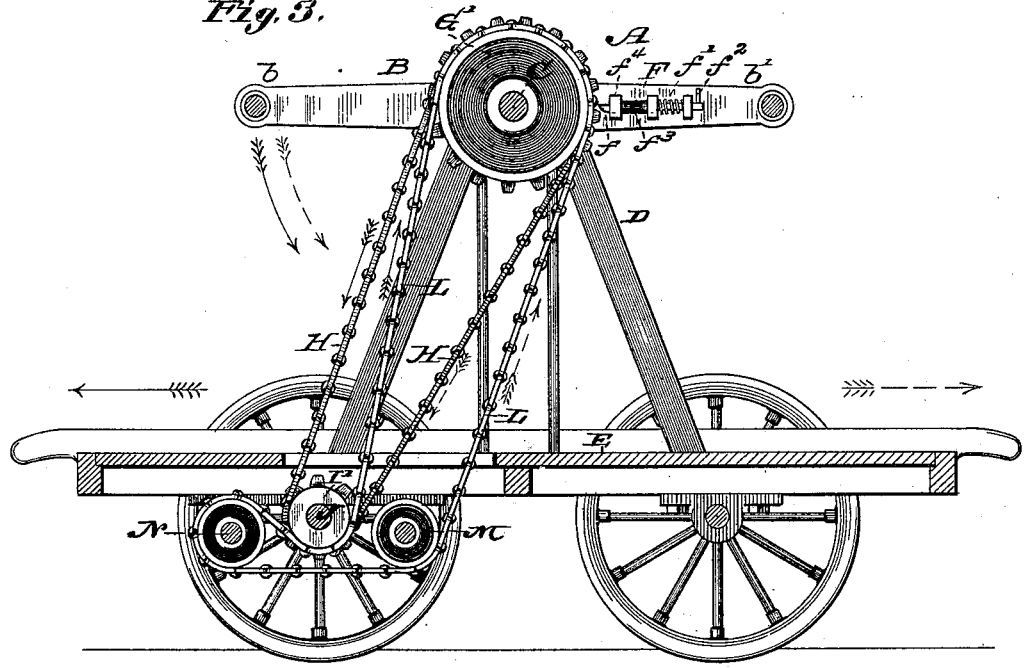
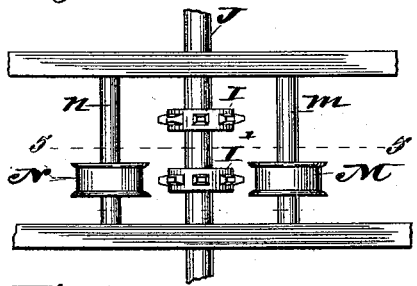
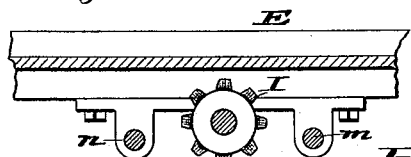
Attest:
N. B. Anderson.
J. W. Hoke.
Inventor:
Raphael G. Rombauer
by C. D. Moody, atty

UNITED STATES PATENT OFFICE.

RAPHAEL G. ROMBAUER, OF CARTHAGE, MISSOURI.

HAND-CAR.

SPECIFICATION forming part of Letters Patent No. 366,882, dated July 19, 1887.

Application filed January 25, 1887. Serial No. 225,450. (No model.)

*To all whom it may concern:*

Be it known that I, RAPHAEL G. ROMBAUER, of Carthage, Jasper county, Missouri, have made a new and useful Improvement in Hand-Cars, of which the following is a full, clear, and exact description.

In the ordinary hand-car in which the power is applied by means of a pitman and crank the difficulty incident to dead-centers is notably experienced. It is impracticable to initiate the movement of the car when the crank is at the dead-point, and the car needs to be pushed until sufficient momentum is acquired to carry the crank easily past the center before the operatives upon the car can keep it moving. The difficulty referred to is obviated and the full power of those propelling the car applied to great advantage by means of the present improvement, which, generally considered, consists substantially as follows: The ordinary lever, in its customary position and operated in the customary manner, is by some suitable means, such as pawls attached to the lever and respectively at opposite sides of the bearing upon which the lever is oscillated, adapted to impart its motion to a pair of ratchets turning loosely upon the lever-bearing. When one end of the lever moves upward, one of the ratchet-wheels is rotated, and when the other end of the lever moves upward the other of the ratchet-wheels is rotated, but in the opposite direction to that of the other ratchet-wheel. The ratchet-wheels respectively are attached to or made part of two sprocket-wheels loose upon the lever-bearing, and which in consequence are rotated with the ratchets. The motions of the sprocket-wheels, by means of chain belts, are respectively communicated to two other sprocket-wheels fast upon the driving-shaft of the car, but so that said last-mentioned sprocket-wheels shall be driven in the same direction. The car is therefore driven by both the up and the down motion of the lever, and whatever the position of the lever, and whether the car is in motion or at a standstill, the full amount of power applied to the lever is utilized. By reversing the pawls the motions of the ratchet-wheels and sprocket-wheels upon the lever-bearing are reversed and the hand-car moved in the opposite direction.

In the annexed drawings, making part of this specification, Figure 1 is a side elevation of a hand-car in which the improvement is embodied. Fig. 2 is a plan thereof. Fig. 3 is a vertical longitudinal section on the line 3 3 of Fig. 2. Fig. 4 is a detail, being a plan, showing the sprocket-wheels upon the driving-shaft and the parts more immediately therewith connected; and Fig. 5 is a vertical longitudinal section on the line 5 5 of Fig. 4.

The same letters of reference denote the same parts.

The hand-car A, saving as it is modified by the improvement under consideration, is of the usual construction.

B represents the lever used by those operating the car. The bearing C, upon which the lever is oscillated, is supported by the uprights D D', which in turn are supported from the car platform or frame E.

F F' represent the pawls with which, and respectively at opposite sides of the bearing C, the lever B is provided.

G G' represent the sprocket-wheels, which are loose on the bearing C. As shown in the drawings, they also serve as the ratchet-wheels, with which the pawls F F' respectively coact.

H represents the chain belt which transmits the motion of the sprocket-wheel G upon the bearing C to the sprocket-wheel I upon the driving shaft or axle J of the car, and L represents the chain belt which transmits the motion of the other sprocket-wheel, G', upon the bearing C to the other sprocket-wheel, I', upon the driving shaft or axle J. To enable the sprocket-wheels I I' to be driven in the same direction, the chain belt L is carried around the idler-pulleys M N upon the bearings *m n*, respectively.

In operation, when the end *b* of the lever B is depressed, the pawl F upon the opposite end, *b'*, of the lever engages in the wheel G, and the pawl F' upon the end *b* of the lever is disengaged from the wheel G', and when the lever end *b'* is depressed the pawl F' engages in the wheel G', and the pawl F is disengaged from the wheel G. This results in driving the various movable parts of the car, and the car itself, in the direction indicated by the arrows in full lines, Fig. 3. When it is desired to reverse the motion of the car, the pawls, which, as illustrated, are in the form of a thrust-bolt having a beveled tooth, $f$, and pressed against the wheel G by means of the spring $f'$, are, by means of the handle $f^2$, withdrawn until the squared portion $f^3$ is released from the squared bearing $f^4$, Figs. 2, 3. The pawls are then reversed—that is, turned around so as to cause the beveled tooth $f$ to point downward in the place of pointing upward, as shown in Fig. 3, and then released to bear again against their respective wheels G G'. The pawl F now engages with the wheel G when the lever end $b'$ is depressed, and the pawl F' with the wheel G' when the lever end $b$ is depressed, and the motion of the parts and of the car is now as indicated by the arrows in broken lines, Fig. 3.

While it is desirable, it is not essential for the oscillating lever and the ratchet and sprocket wheels to have the same bearing. Said wheels may have their own bearing, and it may be located in any suitable position with reference to the lever-bearing, and wherever arranged the lever-pawls should be suitably constructed to operate in conjunction with their ratchets.

I claim—

1. In a hand-car, the combination of the oscillating lever, the pawls, the lever-bearing, the ratchet and sprocket wheels loose upon said lever-bearing, the chain belts, the driving-shaft of the car, the sprocket-wheels fast upon said shaft, and the idler-pulleys, substantially as described.

2. In a hand-car, the combination of the lever-bearing, the sprocket-wheels loose and rotating in opposite directions upon said bearing, the chain belts, the car-driving shaft, the sprocket-wheels fast upon said shaft, and the idler-pulleys, substantially as described.

3. In a hand-car, the combination of the driving-shaft, the two idler-pulleys and their respective bearings, and the sprocket-wheel between said idler-pulleys and fast upon said driving-shaft, substantially as described, and for the purpose of driving said sprocket-wheel in the same direction with that of the other sprocket-wheel upon said driving-shaft.

4. In a hand-car, the combination of the oscillating lever, the reversable pawls, the ratchet and sprocket wheels and their bearing, and the chains, substantially as described.

RAPHAEL G. ROMBAUER.

Witnesses:
C. D. MOODY,
ROBT. J. ROMBAUER.